United States Patent
Lang

(10) Patent No.: US 9,866,311 B2
(45) Date of Patent: Jan. 9, 2018

(54) SYSTEM COMPRISED OF AN ELECTRICAL KITCHEN APPLIANCE AND AN ADD-ON MODULE

(71) Applicant: Vorwerk & Co. Interholding GmbH, Wuppertal (DE)

(72) Inventor: Torsten Lang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 15/504,734

(22) PCT Filed: Aug. 26, 2015

(86) PCT No.: PCT/EP2015/069484
§ 371 (c)(1),
(2) Date: Feb. 17, 2017

(87) PCT Pub. No.: WO2016/030400
PCT Pub. Date: Mar. 3, 2016

(65) Prior Publication Data
US 2017/0257158 A1    Sep. 7, 2017

(30) Foreign Application Priority Data
Aug. 27, 2014   (DE) .................. 10 2014 112 310

(51) Int. Cl.
*H04B 7/00*      (2006.01)
*H04B 7/155*    (2006.01)
(Continued)

(52) U.S. Cl.
CPC .......... *H04B 7/15535* (2013.01); *A47J 36/32* (2013.01); *H04W 76/02* (2013.01); *H04W 84/12* (2013.01)

(58) Field of Classification Search
CPC ......... H04M 1/7253; G05B 2219/2613; G05B 2219/2643; H04L 12/283; H04L 2012/285;
(Continued)

(56) References Cited

U.S. PATENT DOCUMENTS 8,606,180 B2   12/2013   Santinato et al.
2008/0198765 A1*   8/2008   Pirrone ............... H04L 12/2803
                                                                    370/254
(Continued)

FOREIGN PATENT DOCUMENTS

DE          196 49 853 A1      6/1998
DE    10 2012 214 795 A1      2/2014
(Continued)

OTHER PUBLICATIONS

International Search Report of PCT/EP2015/069484, dated Oct. 23, 2015.

*Primary Examiner* — Tu X Nguyen
(74) *Attorney, Agent, or Firm* — Collard & Roe, P.C.

(57) ABSTRACT

A system comprising an electric kitchen appliance and an additional module that can be connected to the electric kitchen appliance for the exchange of data, wherein the additional module has a kitchen appliance interface, via which the data can be transmitted from the additional module to the electric kitchen appliance. The additional module has a radio interface and a repeater, wherein a data connection to a radio network can be established by way of the radio interface such that via the radio network, data signals can be transmitted to the additional module. By way of the repeater, the intensity of received data signals from the radio network can be amplified, and the amplified data signals can be re-transmitted. In this way, an additional benefit is made available to the user of the system.

6 Claims, 1 Drawing Sheet

(51) Int. Cl.
  *H04W 76/02*    (2009.01)
  *A47J 36/32*    (2006.01)
  *H04W 84/12*    (2009.01)

(58) Field of Classification Search
  CPC ........ A47J 27/002; A47J 27/00; A47J 27/004;
          A47J 27/62; A47J 31/60; A47J 36/32;
          A47J 43/046; F24C 7/085; F24C 15/023
  USPC .............................. 455/3.06, 11.1, 13.1, 41.2
  See application file for complete search history.

(56) References Cited

U.S. PATENT DOCUMENTS

2013/0003645 A1    1/2013  Shapira et al.
2014/0345474 A1   11/2014  Trench Rocha et al.

FOREIGN PATENT DOCUMENTS

DE    20 2014 004 271 U1   7/2014
WO       2013/096136 A1    6/2013

\* cited by examiner

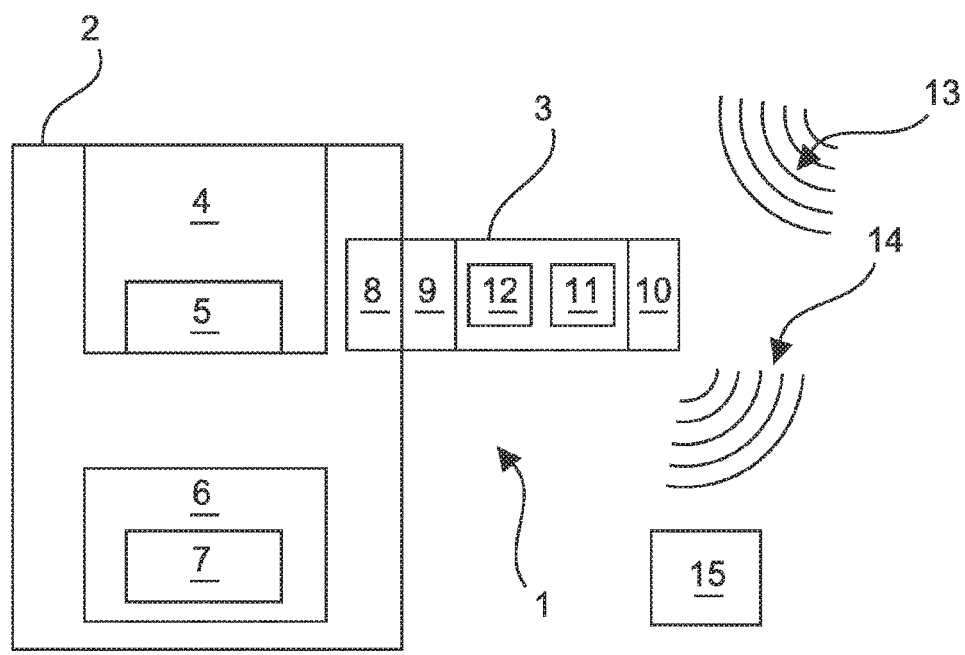

SYSTEM COMPRISED OF AN ELECTRICAL KITCHEN APPLIANCE AND AN ADD-ON MODULE

CROSS REFERENCE TO RELATED APPLICATIONS

This application is the National Stage of PCT/EP2015/069484 filed on Aug. 26, 2015, which claims priority under 35 U.S.C. §119 of German Application No. 10 2014 112 310.7 filed on Aug. 27, 2014, the disclosures of which are incorporated by reference. The international application under PCT article 21(2) was not published in English.

The invention relates to a system comprised of an electrical kitchen appliance and an add-on module that can be connected to the electrical kitchen appliance for exchanging data with the latter, wherein the add-on module exhibits a kitchen appliance interface, over which the data can be transmitted from the add-on module to the electrical kitchen appliance.

For example, a system comprised of an electrical kitchen appliance and an add-on module that can be connected thereto for exchanging data is known from DE 20 2014 004 271 U1. The add-on module exhibits a radio interface. Known from DE 196 49 853 is to provide a repeater for adequate radio coverage. Known from U.S. Pat. No. 8,606,180 B2 is a system comprised of an electrical household appliance and a connectable user interface, wherein the user interface can detect other household appliances that are present in a network. A household appliance can be set up to strengthen the signals of adjacent household appliances. With respect to prior art, reference is further made to DE 10 2012 214 795 A1 and US 2013/0003645 A1.

For example, such electrical kitchen appliances are known from practice in the form of universal food processors, which apart from mechanically processing foods, e.g., with an agitator or cutting blade, also makes it possible to cook the foods. In order to prepare a corresponding meal, predetermined recipes are often provided, which exhibit several sequential recipe steps. In order to allow the user of such an electrical kitchen appliance to prepare a meal according to such a predetermined recipe, it can also be provided that recipe data for the predetermined recipes be transmitted from outside to the electrical kitchen appliance.

To this end, an add-on module can be provided, which can be connected to the electrical kitchen appliance. Corresponding recipe data can be stored on this add-on module. However, it can also be provided that a connection to an external server can be established with the add-on module, e.g., via a radio network or the internet, so that recipe data stored on the external server can be transmitted to the electrical kitchen appliance.

Proceeding from the mentioned prior art, the invention deals with the task of indicating a system comprised of an electrical kitchen appliance and an add-on module, which provides for the most reliable possible, convenient interaction with the kitchen appliance by radio.

This object is achieved by having the add-on module exhibit a radio interface and repeater, wherein the radio interface can be used to establish a data connection with a radio network, so that data signals can be transmitted to the add-on module via the radio network, and the repeater can be used to strengthen the intensity of received data signals of the radio network and send out the strengthened data signals once again, and on having the repeater be set up in such a way that the intensity of received data signals of the radio network can only be strengthened and the strengthened data signals can only be sent out again if the add-on module has been connected to the electrical kitchen appliance.

Therefore, the invention lies in a system comprised of an electrical kitchen appliance and an add-on module that can be connected to the electrical kitchen appliance for exchanging data with the latter, wherein the add-on module exhibits a kitchen appliance interface, over which the data from the add-on module exhibits a radio interface and a repeater, wherein the radio interface can be used to establish a data connection with a radio network, so that data signals can be transmitted to the add-on module via the radio network, and the repeater can be used to strengthen the intensity of received data signals of the radio network and send out the strengthened data signals once again. As a consequence, this repeater function of the add-on module essentially corresponds to the function attributed to a conventional mobile radio repeater or WLAN repeater, specifically to receive the data signals of the radio network in an area where a radio network is weaker, and strengthen their intensity before sending them out again. The range of the radio network is increased in this way.

The configuration according to the invention for the system comprised of the electrical kitchen appliance and add-on module is advantageous from the standpoint that an already present add-on module, which is used for connecting the electrical kitchen appliance with a radio network, additionally provides a repeater function for this radio network, so that the user of the system comprised of the electrical kitchen appliance and add-on module, but also other individuals in the environment of this system, come to enjoy a radio network that has been improved by strengthening its intensity.

In particular, a situation may often be encountered in which WLAN service in a private household may be good in the living and working areas, but less so in the kitchen area, where the system comprised of the electrical kitchen appliance and add-on module is provided. In such situations, the system according to the invention, and in particular the add-on module, which is provided anyway for accessing the radio network, can provide improved radio network coverage in the kitchen and in areas beyond that as well, without any major additional outlay.

In addition, it can basically be provided that the radio interface is set up in such a way that the data connection with the radio network can only be established if the electrical kitchen appliance is turned on, i.e., is in its operating mode where foods can be processed. However, a preferred further development of the invention provides that the radio interface be set up in such a way that the data connection with the radio network can also be established if the electrical kitchen appliance is not in its operating mode. This means that a data connection with the radio network can preferably always be established when the add-on module is connected to the electrical kitchen appliance, and the electrical kitchen appliance is connected to a power supply, such as the household power supply or a battery, regardless of whether the electrical kitchen appliance is completely turned off, or is in its standby mode or its operating mode.

In this way, the repeater functionality of the add-on module is made available independently of the actual operation of the electrical kitchen appliance, during which the foods can be processed, so that the user of the radio network with strengthened intensity does not have to depend on turning on the electrical kitchen appliance for this purpose, even though only the repeater function is to be used, but no foods are to be processed.

In like manner, the repeater can be set up in such a way that the intensity of received data signals of the radio network are strengthened regardless of whether the add-on module is connected to the electrical kitchen appliance, and the strengthened data signals are sent out again. However, a preferred further development of the invention provides that the repeater be set up in such a way that the intensity of received data signals of the radio network can only be strengthened and the strengthened data signals can only be sent out again if the add-on module has been connected to the electrical kitchen appliance.

In addition, the repeater can be set up in such a way that its function is only available in the operating mode of the electrical kitchen appliance, i.e., if the kitchen appliance has been turned on. However, a preferred further development of the invention provides that the repeater be set up in such a way that the intensity of received data signals of the radio network can also be strengthened and the strengthened data signals can be sent out again when the electrical kitchen appliance is not in its operating mode, meaning, for example, is turned off or in the standby mode.

The system according to the invention can basically be used for any type of radio network. In a preferred further development of the invention, the radio network is a WLAN network, a mobile radio network and/or a DECT network.

The data that can be received by the add-on module from the radio network can vary widely in nature. However, in one preferred further development of the invention, the electrical kitchen appliance is provided for preparing meals according to predetermined recipe data, wherein the add-on module can be used to establish a connection with an external memory, namely via the radio network, wherein such recipe data are stored on the external memory.

The invention will be explained in greater detail below based on a preferred exemplary embodiment, while referring to the drawing.

In the drawing, the sole FIGURE schematically depicts a system comprised of an electrical kitchen appliance and an add-on module connected to the latter for data exchange according to a preferred exemplary embodiment of the invention.

Schematically evident on FIG. 1 is a system 1 comprised of an electrical kitchen appliance 2 and an add-on module 3 connected thereto. The electrical kitchen appliance 2 is provided for preparing meals according to predetermined recipe data. To this end, the electrical kitchen appliance 2 exhibits a processing chamber 4 for processing foods with a processing device 5. The processing device 5 is here an agitating and cutting mechanism, in which a food introduced into the processing chamber 4 can be comminuted, mixed and kneaded.

The functions of the electrical kitchen appliance are controlled by a central control unit 6, which is provided with a memory 7. In addition, the electrical kitchen appliance 2 exhibits an add-on module interface 8, to which the add-on module 3 is connected.

The add-on module 3 is for its part provided with a kitchen appliance interface 9 for connection to the electrical kitchen appliance 2. Specifically, in the preferred exemplary embodiment of the invention described here, the add-on module interface 8 of the electrical kitchen appliance 2 is designed as a socket, and the kitchen appliance interface 9 of the add-on module 3 is designed as a plug, so that the add-on module 3 can be plugged into the electrical kitchen appliance 2 via the add-on module interface 8 and the kitchen appliance interface 9.

The add-on module 3 further exhibits a radio interface 10, which can be used to establish a data connection with the radio network 13. In the present case, the radio network 13 is a WLAN network provided by a WLAN router, which is here not shown in any more detail. In addition, the add-on module 3 exhibits a buffer 12, in which data received over the radio network 13 can be buffered, in particular for buffering a data transmission to the electrical kitchen appliance 2.

The data signals of the radio network 13, which are received via the radio interface 10 of the add-on module 3, can on the one hand be relayed via the kitchen appliance interface 9 and add-on module interface 8 to the electrical kitchen appliance, so that the data associated therewith can there be stored in the memory 7, and are available for processing in the central control unit 6. The data actually transmitted to the memory 7 of the electrical kitchen appliance 2 are the data from the radio network 13 that are actually provided for the electrical kitchen appliance or add-on module 3 connected thereto. Moreover, however, the radio network 13 can contain additional data signals with other data, which are intended for other devices or can be used by other devices.

Exemplarily shown to this end is a smartphone 15 of the user of the system 1 comprised of the electrical kitchen appliance 2 and add-on module 3 connected thereto. Provided in the add-on module 3 apart from the radio interface 10 is also a repeater 11, so that the smartphone 15 can receive data signals from the radio network 13, and thus use transmitted data. The functionality is here such that all data signals of the radio network 13 received by the radio interface 10 are relayed to the repeater 11. These data signals are strengthened in the repeater 11, and then returned to the radio interface 10 again, so that they can be sent out again from there. This is schematically depicted on the FIGURE as a strengthened radio network 14.

As a mobile device, the smartphone 15 does not have the same reception capabilities for weak radio networks as floor-mounted appliances, which stems in particular from the compact dimensions of the smartphone 15. In the present case, it would therefore not be possible to receive data signals from the weak radio network 13 with the smartphone 15 in such a way that the data to be transmitted therewith arrive at the smartphone completely and flawlessly, and can there be used. However, strengthening the radio network 13 in the repeater 11 and sending out a strengthened radio network 14 allows the smartphone 15 to use the data from the radio network 13 as well, specifically indirectly, namely after the strengthening in the repeater 11 and sending out of the strengthened network 14 over the radio interface 10 of the add-on module.

According to the preferred exemplary embodiment of the invention, the advantage of the presently described system comprised of the electrical kitchen appliance 2 and add-on module 3 lies in particular in the fact that the add-on module 3 required anyway, which is needed for connecting the electrical kitchen appliance 2 with the radio network 13, additionally acts as a repeater 11 for this radio network 13. This results in a strengthened radio network 14, which also provides an improved radio network coverage in the environment of the system 1 comprised of the electrical kitchen appliance 2 and add-on module 3 without any additional outlay, specifically with the add-on module 3 present anyway, which is required for accessing the radio network 13. This also means that, as a result, the radio network 13 can now be used for data transmission in areas where no data could previously be received by way of the radio network 13 without the add-on module 3.

REFERENCE LIST

System 1
Electrical kitchen appliance 2
Add-on module 3
Processing chamber 4
Processing device 5
Central control unit 6
Memory 7
Add-on module interface 8
Kitchen appliance interface 9
Radio interface 10
Repeater 11
Buffer 12
Radio network 13
Strengthened radio network 14
Smartphone 15

The invention claimed is:

1. A system comprised of an electrical kitchen appliance (2) and an add-on module (3) that can be connected to the kitchen appliance (2) for data exchange, wherein the add-on module (3) exhibits a kitchen appliance interface (9), over which the data can be transmitted from the add-on module (3) to the electrical kitchen appliance (2), wherein the add-on module (3) exhibits a radio interface (10) and a repeater (11), wherein the radio interface (10) can be used to establish a data connection with a radio network (13), so that data signals can be transmitted to the add-on module (3) via the radio network (13), and wherein the repeater (11) can be used to strengthen the intensity of received data signals of the radio network (13) and send out the strengthened data signals once again, and wherein the repeater (11) is set up in such a way that the intensity of received data signals of the radio network (13) can only be strengthened and the strengthened data signals can only be sent out again if the add-on module (3) has been connected to the electrical kitchen appliance (2).

2. The system according to claim 1, wherein the radio interface (10) is set up in such a way that the data connection with the radio network (13) can only be established if the add-on module (3) has been connected to the electrical kitchen appliance (2).

3. The system according to claim 1, wherein the radio interface (10) is set up in such a way that the data connection with the radio network (13) can also be established if the electrical kitchen appliance (2) is not in its operating mode.

4. The system according to claim 1, wherein the repeater (11) is set up in such a way that the intensity of received data signals of the radio network (13) can also be strengthened and the strengthened data signals can be sent out again when the electrical kitchen appliance (2) is not in its operating mode.

5. The system according to claim 1, wherein the radio network (13) is a WLAN network, a mobile radio network and/or a DECT network.

6. The system according to claim 1, wherein the electrical kitchen appliance (2) is provided for preparing meals according to predetermined recipe data, and the add-on module (3) can be used to establish a connection with an external memory, on which such recipe data are stored.

\* \* \* \* \*